W. R. WHITAKER.
ATTACHMENT FOR CULTIVATORS.
APPLICATION FILED DEC. 6, 1915.
1,206,278.
Patented Nov. 28, 1916.
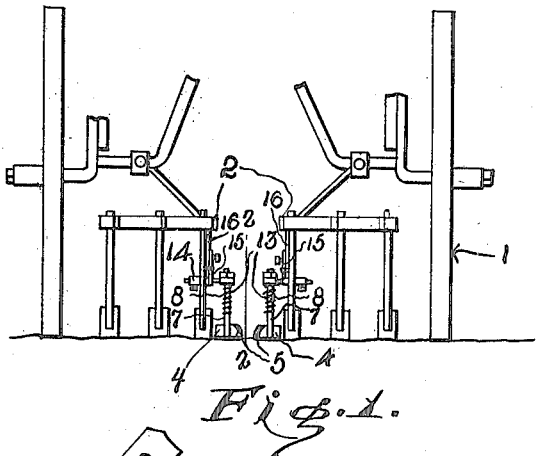
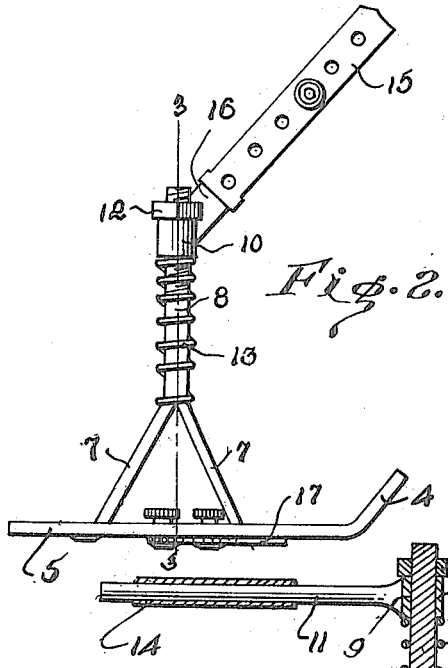
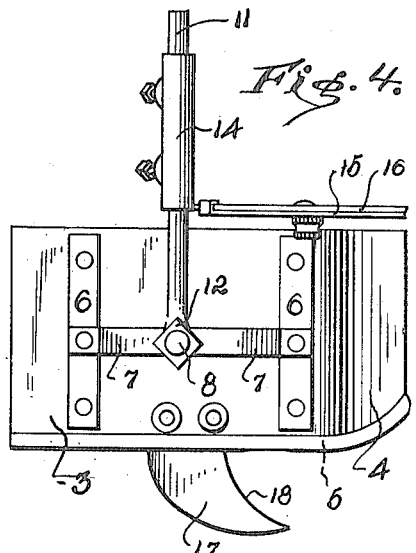
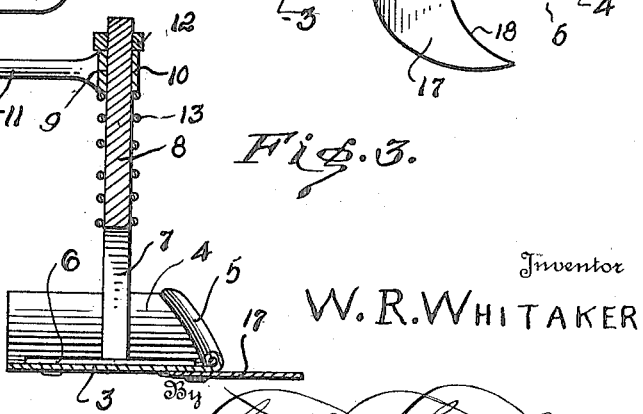
Witnesses
H. H. Costello
A. Ellison
Inventor
W. R. WHITAKER
By Chandler & Chandler
Attorneys

UNITED STATES PATENT OFFICE.

WILLIAM R. WHITAKER, OF WINSTON, MISSOURI.

ATTACHMENT FOR CULTIVATORS.

1,206,278. Specification of Letters Patent. Patented Nov. 28, 1916.

Application filed December 6, 1915. Serial No. 65,301.

*To all whom it may concern:*

Be it known that I, WILLIAM R. WHITAKER, a citizen of the United States, residing at Winston, in the county of Daviess, State of Missouri, have invented certain new and useful Improvements in Attachments for Cultivators; and I do hereby declare the following to be a full, clear, and exact description of the invention, such as will enable others skilled in the art to which it appertains to make and use the same.

The present invention is directed to improvements in attachments for cultivators adapted to mash down the weeds in advance of the cultivator teeth so that the soil turned up by the teeth will cover the weeds.

A further object of the invention is to provide a device of this character so constructed that the same can be easily and quickly attached to a conventional form of cultivator, and further to provide a device of this character which can be easily adjusted to suit rows of different width.

A still further object of the invention is to provide a device of this character constructed in such a manner that the same will yield should clods or stones be encountered.

With these and other objects in view, this invention resides in the novel features of construction, formation, combination and arrangement of parts to be hereinafter more fully described, claimed and illustrated in the accompanying drawings, in which:

Figure 1 is a rear elevation of a cultivator equipped with the device. Fig. 2 is a sectional view on line 2—2 of Fig. 1. Fig. 3 is a sectional view on line 3—3 of Fig. 2. Fig. 4 is a top plan view of one of the plates.

Referring to the drawing 1 indicates the wheeled cultivator of any well known form, the beams of which have secured thereto clamps 2, said clamps being of any suitable construction.

In use two of the devices are used, therefore the description of one will suffice for both. Each device comprises a metallic plate 3, the forward end of which is curved upwardly, as at 4, so as to permit the same to ride very easily over the soil as the cultivator is moved forwardly. The inner edge of the plate 3 is provided with a wire filled bead 5 whereby the plate is strengthened longitudinally, said plates being also provided with transverse strips 6 to which are riveted the lower ends of the legs 7, said legs merging at their upper ends into a shank 8, which is rectangular in cross section and slidably engages the rectangular bore 9 in the head 10, said head being provided with an arm 11, the purpose of which will appear later.

The upper end of the shank 8 has mounted thereon a nut 12 to limit the upward movement of the head 10. A coil spring 13 encircles the shank and has its upper end engaged under the head 10, while the lower end thereof is prevented from moving downwardly owing to the presence of the legs 7, said spring serving to return the plate 3 to its lowermost position after the same has passed over an obstruction.

Adjustably secured upon the arm 11 is a sleeve 14, said sleeve having fixed thereto a bar 15, and to said bar is adjustably connected another bar 16 which is adapted to be engaged in the clamps 2, whereby the device can be attached to the cultivator beam. By providing the sleeve 14 it is obvious that the plate can be adjusted laterally so that the device can be used on rows of different width.

Removably connected to the inner edges of the plates 3 are hook-shaped blades 17 having arcuate cutting edges 18. Since the blades are removable it is obvious that they can be reversed so that the same can be used for thinning corn or cotton, it being understood of course that when the cutting edges 18 are disposed forwardly that the same will sever the plants, while in the reverse direction the blade will hook the plants.

What is claimed is:—

An attachment for cultivators comprising a pair of plates having upturned forward edges, shanks supported by the plates, arms having heads formed upon their inner ends and slidably engaged by the shanks, sleeves adjustably connected to the arms, and means for adjustably connecting the sleeves to the beams of the cultivator.

In testimony whereof, I affix my signature, in the presence of two witnesses.

WILLIAM R. WHITAKER.

Witnesses:
O. E. EMERY,
E. G. HULL.

Copies of this patent may be obtained for five cents each, by addressing the "Commissioner of Patents, Washington, D. C."